UNITED STATES PATENT OFFICE.

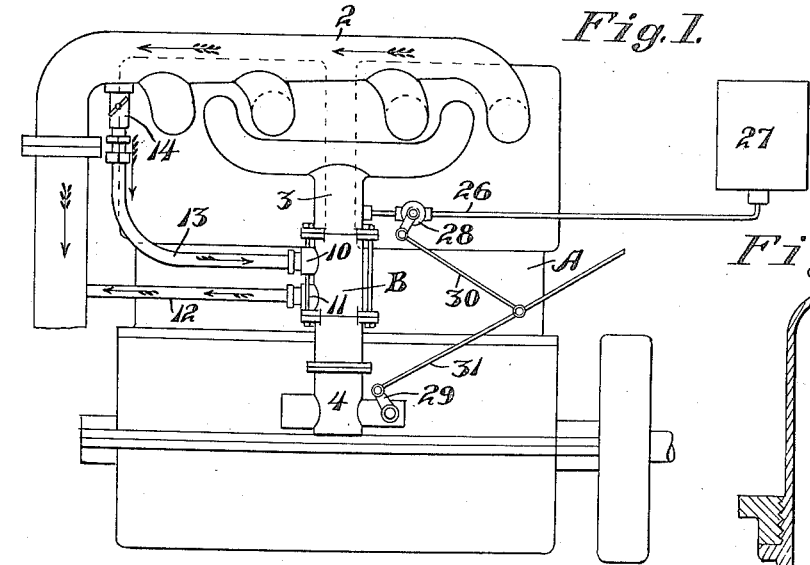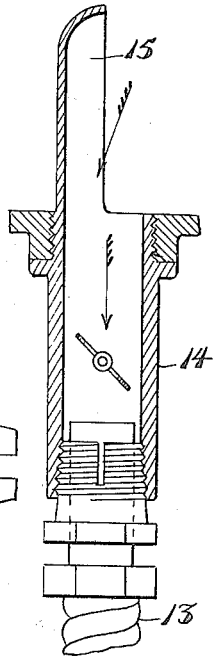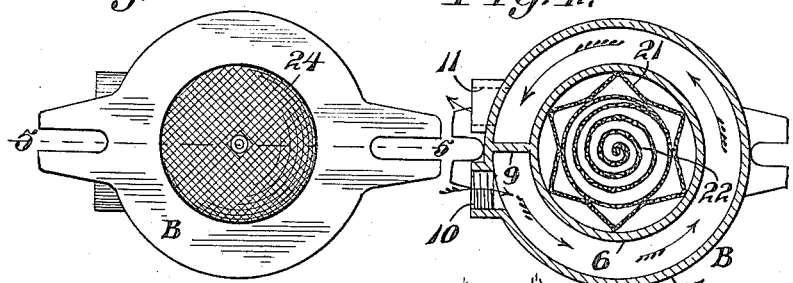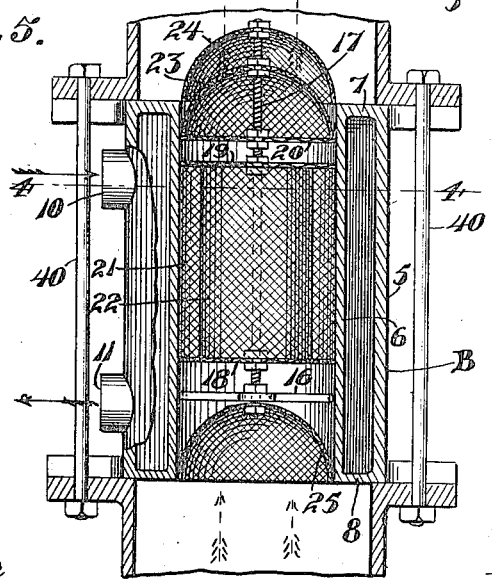

MARVIN H. BROWN, OF SAN FRANCISCO, CALIFORNIA, ASSIGNOR TO H. J. McGINNIS, R. O'CONNOR, B. M. VIGOUREUX, ALL OF SAN FRANCISCO, CALIFORNIA, AND C. P. EGGLESTON, OF OAKLAND, CALIFORNIA.

FUEL HEATER AND MIXER.

1,269,252. Specification of Letters Patent. Patented June 11, 1918.

Application filed January 11, 1917. Serial No. 141,796.

*To all whom it may concern:*

Be it known that I, MARVIN H. BROWN, a citizen of the United States, residing at the city and county of San Francisco and State of California, have invented new and useful Improvements in Fuel Heaters and Mixers, of which the following is a specification.

This invention relates to a fuel heater and mixer for internal combustion engines.

One of the objects of the present invention is to provide a simple, efficient, easily applied fuel heater and mixer for internal combustion engines which is adapted to be interposed between the carbureter and intake manifold and operable to thoroughly mix and heat the gases proceeding from the carbureter as well as break up any globules of fuel before they enter the manifold and the cylinders where combustion takes place.

The invention further resides in the combination and arrangement of parts and in the details of construction which will be more fully explained by reference to the accompanying drawings, in which—

Figure 1 is a side elevation of an internal combustion engine, showing the application of the invention.

Fig. 2 is an enlarged, vertical, central section of the exhaust deflector.

Fig. 3 is a plan view of the fuel heater and mixer.

Fig. 4 is a cross section on line 4—4 of Fig. 5.

Fig. 5 is a central, vertical section on line 5—5 of Fig. 3.

Referring to the drawings in detail, A indicates the cylinders of an internal combustion engine, 2 the exhaust manifold, 3 the inlet manifold, and 4 the carbureter. Interposed between the inlet manifold and the carbureter is a jacketed, cylindrical-shaped casing B consisting of an outer shell 5 and an inner concentric shell 6 which are tied together by a flanged head and bottom section, indicated at 7 and 8, respectively, and a partition rib 9.

Formed in the jacket on one side of the rib, near the upper end, is an inlet opening 10 which communicates with the annular space between the inner and outer shell and formed on the other side of the rib, near the lower end of the casing, is an outlet opening 11 which is connected with the exhaust pipe by means of a pipe 12. The inlet opening is connected with the exhaust manifold by a pipe 13, and a butterfly valve 14 in said pipe line permits the amount of exhaust gases by-passed to be regulated. For the purpose of insuring a positive circulation of exhaust gases through the pipes 12 and 13 and the jacket of the casing B a shovel-like member 15 has been provided which projects into the exhaust manifold. This deflector is formed integral with the valve casing 14 and has sufficient area and length to produce a scoop-like deflecting surface in the path of the discharging gases which insures the circulation desired.

Formed integrally with the inner shell 6, or otherwise secured to same, is a spider 16 which supports the centrally disposed threaded rod 17, and secured by nuts on said rod is a plurality of horizontally disposed screens 18, 19 and 20. Interposed between the screens 18 and 19 is a vertically positioned screen 21 which is star-shaped in cross section, and mounted interiorly of said star-shaped screen is a vertically positioned scroll screen 22. Secured above the horizontal screen 20 upon the rod 17 is a pair of hemispherical screens 23 and 24, and secured upon the central rod, below the spider 16, is a hemispherical screen 25.

Connected with the inlet manifold, above the casing B, is a pipe 26 which is connected with a suitable source of water supply, as the tank 27, and mounted on said pipe is a valve 28 which is opened and closed in unison with the throttle valve 29 on the carbureter by means of the link connections shown at 30 and 31. A fuel heater and mixer connected and applied as here shown is particularly adapted for use where high gravity oils, such as distillate, kerosene, and the like, are employed.

In actual operation, when the engine is running, it can readily be seen that practically any amount of exhaust gases may be by-passed through the jacketed casing B by opening or closing the butterfly valve 14. The inner shell 5 is in this manner raised to a comparatively high temperature and as all the gases proceeding from the carbureter must pass through said shell before entering the inlet manifold 3, it is obvious that they will become heated. The several horizontal and hemispherical screens cause any fuel globules entering to be thoroughly broken up and atomized as considerable heat is conducted to said screens from the walls and inner shell 6. It is obvious that any fuel which has a tendency to adhere to the surface of said screens will quickly vaporize. The star-shaped screen 21, together with the scroll 22, is also an important feature in this connection as considerable heat is conducted to said screens, thereby maintaining these at a comparatively high temperature.

It is well-known that the several varieties of high gravity oils are very tenacious and tend to cling or adhere to the several screens provided. Any oil that adheres to the scroll and star-shaped screens will, therefore, rapidly vaporize and the high velocity produced by the suction in the manifold, furthermore, breaks up any globules which might otherwise pass through The water injector provided is also beneficial and as the valve 28 is opened and closed in unison with the throttle valve 29 an automatic regulation and proportioning of fuel and water is always maintained. The water entering the inlet manifold is immediately broken up and thoroughly mixed with the incoming charge, in this manner forming a homogenous mixture containing considerable moisture. This mixture is more readily burned or exploded within the cylinders and, therefore, eliminates any tendency toward forming carbon or sooting up the plugs as is usually the case where heavy fuel oils are employed.

The device as a whole is simple and substantial in construction and as the fuel heating and mixing device may be interposed between the carbureter and the inlet manifold, by means of bolts 40, it is possible to make installations on practically any standard engine employed. The whole installation can be quickly and easily applied and in actual practice it not only decreases the fuel consumption but also increases the power and general efficiency to a considerable extent.

The materials and finish of the several parts of the device are such as the experience and judgment of the manufacturer may dictate.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. In a fuel heating and mixing device for internal combustion engines, a casing having an inlet for connection to the carbureter and an outlet for connection to the inlet manifold and means to heat same by the exhaust gases, a spider in said casing, a vertical rod supported by the spider, a hemispherical screen supported by the lower end of the rod and located below the spider, a pair of vertically spaced horizontal screens on the rod the lower of which is located above the spider, a vertical screen of substantially star-shape cross section between said horizontal screens, a vertical scroll screen on the interior of the star-shaped screen, a pair of spaced hemi-spherical screens on the rod located above the upper horizontal screen and arranged one within the other, and a horizontal screen on the rod spaced above said upper horizontal screen and extending across the concave sides of said pair of hemispherical screens.

2. In a fuel heating and mixing device for internal combustion engines, a casing having an inlet for connection to the carbureter and an outlet for connection to the inlet manifold and means to heat same by the exhaust gases, a vertical screen in the casing, horizontal screens extending across the ends of the vertical screen, a downwardly facing hemispherical screen below the lower horizontal screen, and a downwardly facing hemispherical screen above the upper horizontal screen.

3. In a fuel heating and mixing device for internal combustion engines, a casing having an inlet for connection to the carbureter and an outlet for connection to the inlet manifold and means to heat same by the exhaust gases, a vertical screen in the casing, horizontal screens extending across the ends of the vertical screen, a downwardly facing hemispherical screen below the lower horizontal screen, a pair of nested downwardly facing hemispherical screens above the upper horizontal screen, and a horizontal screen spaced above said upper horizontal screen and extending across the lower ends of said pair of hemispherical screens.

In testimony whereof I have hereunto set my hand in the presence of two subscribing witnesses.

MARVIN H. BROWN.

Witnesses:
   GENEVIEVE S. DONELIN,
   JOHN H. HERRING.